United States Patent [19]

Thomas et al.

[11] 4,388,078
[45] Jun. 14, 1983

[54] ANTHRAQUINONE DYESTUFF MODIFICATION

[75] Inventors: Thomas J. Thomas; Robert G. Hoquet, both of Summerville, S.C.

[73] Assignee: Mobay Chemical Corporation, Pittsburgh, Pa.

[21] Appl. No.: 361,223

[22] Filed: Mar. 24, 1982

[51] Int. Cl.³ .............................................. D06P 3/79
[52] U.S. Cl. ........................................... 8/514; 8/526; 8/532; 8/678; 8/922; 260/208; 260/373
[58] Field of Search ................... 8/526, 678, 514, 532; 260/373, 208

[56]  References Cited

U.S. PATENT DOCUMENTS

| | | | |
|---|---|---|---|
| 2,007,382 | 7/1935 | Ockman et al. | 8/526 |
| 3,467,681 | 9/1969 | Hederich et al. | 8/678 |
| 4,074,965 | 2/1978 | Kruse et al. | 8/662 |
| 4,319,880 | 3/1982 | Opitz et al. | 8/526 |
| 4,327,999 | 5/1982 | Koller et al. | 8/526 |
| 4,329,144 | 5/1982 | Eugster et al. | 8/526 |
| 4,332,588 | 6/1982 | Eugster et al. | 8/526 |

FOREIGN PATENT DOCUMENTS 2536052 2/1977 Fed. Rep. of Germany .
1543316 4/1979 United Kingdom .

Primary Examiner—A. Lionel Clingman
Attorney, Agent, or Firm—Gene Harsh; Lawrence S. Pope

[57] ABSTRACT

The present invention is concerned with modifying the crystal form of the anthraquinone of the formula

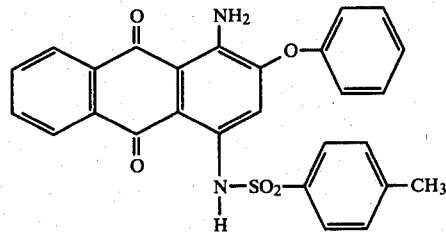

so as to render it more suitable for disperse dyeing and to improve its performance in thermosol dyeing. The modification is effected by heating the dyestuff at elevated temperatures, preferably between 90° and 185° C. until the Debye-Scherrer strong intensity spacings appear at 6.5A°, 18.1A° and 20.6A°. It is also concerned with disperse and thermosol dyeing processes utilizing this crystal modification and with aqueous dispersions of this crystal modification.

15 Claims, 2 Drawing Figures

ANTHRAQUINONE DYESTUFF MODIFICATION

FIELD OF THE INVENTION

The subject of this invention is a new crystal modification of the anthraquinone dyestuff of the formula

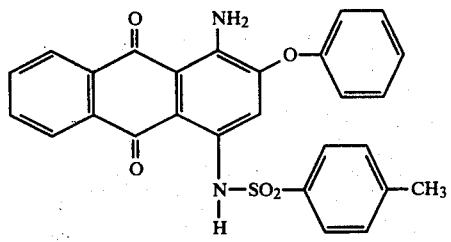

characterized by a melting point of 199°–200° C. and lattice plane spacings of strong intensity at 6.5 A°, 18.1 A° and 20.6 A°; of moderate intensity at 10.2 A°, 10.4 A°, 15.9 A°, 16.4 A°; of faint intensity at 21.0 A°, 28.5 A° and 28.9 A°, its preparation and use for coloration of synthetic and semi-synthetic fibers and plastics.

BACKGROUND OF THE INVENTION

Anthraquinone dyes have been very well known for the dyeing of synthetic fiber-based substrates. Some of these dyestuffs have found particular utility in the disperse, continuous and thermosol dyeing of polyester fabric. Among these dyes, the dye of the above formula has been of particular interest because of its superior lightfastness. Unfortunately, its utility has been limited by its instability in aqueous dispersion. In particular, on being subject to the dyeing temperatures utilized in either "at the boil" or pressurized exhaust dyeing (100° to about 140° C.) aqueous dispersions of this dyestuff form unacceptably large agglomerates. This, in turn, leads to deposits of precipitated dyestuff on the fiber, giving rise to stippled or specky dyeings and to incomplete exhaustion of the dye bath. Surprisingly, a modification in the crystal form of this dyestuff renders its aqueous dispersion stable under these conditions leading to level dyeings without specking and essentially complete exhaust of the bath.

Apparently, this crystal modification can occur to some extent if the known crystal form is subjected to exhaust dyeing conditions. However, this transformation is evidently accompanied by crystal growth which renders aqueous dispersions unstable. Therefore, the art did not utilize this dyestuff in such dyeing procedures in spite of its excellent lightfastness. It has now been discovered that this latter crystal form is stable and resistant to crystal growth at exhaust dyeing temperatures. Therefore, if an appropriate particle size is utilized, its aqueous dispersion remains stable.

BRIEF DESCRIPTION OF THE DRAWINGS

FIG. 1 is the pattern of "Modification B" and FIG. 2 that of "Modification A".

SUMMARY OF THE INVENTION

Figure 1:
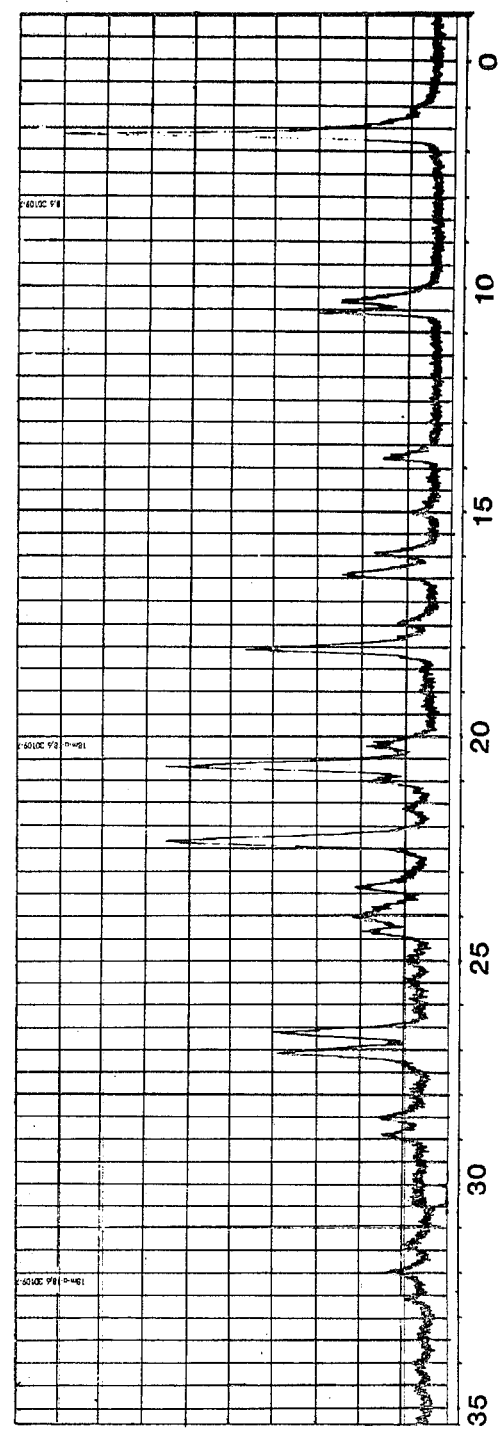
FIGS. 1 and 2 are Debye-Scherrer X-ray diffraction patterns generated using the K emission line of a Cu target with a Ni filter to obtain monochromatic radiation with a wave length of 1.5418 A°.
Figure 2:
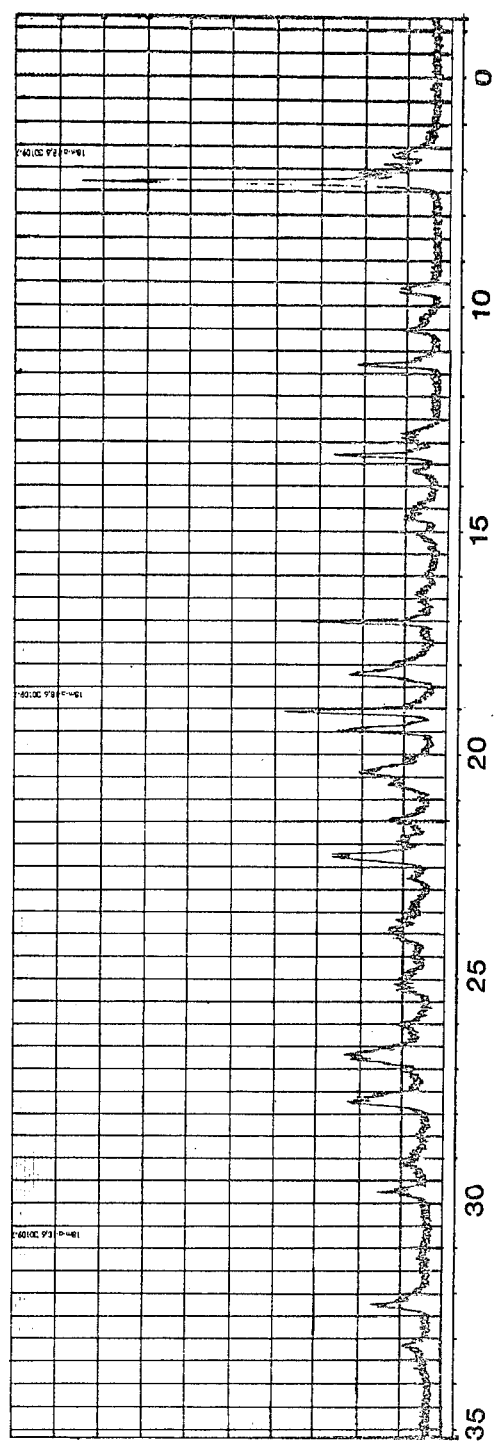

The new modification with a melting point of 199°–200° C. (hereinafter called Modification "B") is characterized by the lattice plane spacings mentioned above as calculated from the Debye-Scherrer diagram (FIG. 1). It can be prepared in a technologically simple manner by heating an aqueous slurry of the known modification (hereinafter called Modification "A"), which has a melting point of 190.0°–191.5° C. and is characterized by lattice plane spacings of strong intensity at 7.2 A°, 19.0 A° and 19.4 A°; medium intensity at 11.2 A°, 13.2 A°, 17.0 A° and 27.8 A°; faint intensity at 9.7 A°, 12.9 A° and 29.8 A° (FIG. 2), to 90° to 185° C., preferably to 125° to 150° C. This process can also be carried out in the presence of anionic surfactants or simply by heating the bulk dyestuff of Modification "A". Modification "A" is obtained as described in Example 1, U.S. Pat. No. 3,467,681.

DETAILED DESCRIPTION OF THE INVENTION

The dyestuff modification which is described in this invention can, like the hitherto known modification which is not a stable dye, be converted to a very finely divided state by the usual mechanical procedures, especially in the presence of dispersing agents. The customary mechanical devices, such as ball mills, vibratory mills, sand mills or colloid mills, are suitable for the fine division which may be carried out. The dispersing agents are, for example, condensation products of naphthalene sulfonic acid and formaldehyde, lignosulfonates or nonionic and anionic surface-active compounds.

Aqueous dispersions of Modification "B" are suitable for dyeing of synthetic and semi-synthetic fibers from aqueous media by the usual dyeing procedures. Aqueous dispersions of Modification "B" are especially suitable for the dyeing of polyester according to exhaust and thermosol processes without displaying the disadvantages of the unstable "A" modification which displays a strong tendency to dye nonuniformly in a high temperature aqueous medium.

A further advantage of Modification "B" is that, when applied to polyester fabric from aqueous dispersions by the thermosol process, it is more readily fixed than Modification "A". When applied by the thermosol process, Modification "A" requires for complete fixation between 120 seconds at 216° C. and 60 seconds at 227° C., whereas Modification "B" requires only between 90 seconds at 216° C. and 30 seconds at 227° C. These less rigorous thermofixation conditions not only result in considerable time and energy savings but also lessen the degree of thermal degradation of the polyester.

Although polyester dyeings made with Modification "A" already exhibit excellent sublimation-fastness and lightfastness, surprisingly, it was found that dyeings made with Modification "B" even surpass the lightfastness of dyeings made with Modification "A".

EXAMPLES

Example 1

A slurry of 80 g of Modification "A" in 312 g of water is heated with agitation to 125° C. in a stainless steel autoclave for ten hours. Then the slurry is cooled to 25° to 30° C. and filtered on a Buechner funnel. The filtercake weighs approximately 100 g and has a solid content of approximately 80% and consists entirely of Modification "B". Upon drying at 60° C., 80 g of dry material are obtained.

Example 2

A slurry of 120 g of Modification "A", which had been milled to an average particle size of less than 1 μm with 120 g of a lignosulfonate dispersant and 500 ml of water in 3250 g of water is heated with agitation to 135° C. in a stainless steel autoclave for one hour. The slurry is cooled to 30° C. and filtered on a Buechner funnel. The filtercake has a solids content of approximately 45% and consists entirely of Modification "B". Upon drying at 60° C., 120 g of dry material are obtained.

Example 3

300 g of a water wet filtercake containing 80% solids of Modification "B" prepared as described in Example 1, are blended with 120 g of lignin-sulfonate dispersant and 380 ml of water. The resulting slurry is milled, first using a rotor-stator colloid mill and, subsequently, using a sand mill filled with 1.0 mm glass beads, for approximately 30 minutes at 20°–30° C., resulting in 800 g of a heat stable dyestuff dispersion.

Example 4

A dye liquor is prepared by mixing 1.0 g of the dyestuff dispersion of Modification "B", prepared as described in Example 3, with 500 ml of water. 5.0 g of polyester fiber is introduced into the dye liquor, and acetic acid is added until a pH of 4 to 4.5 is reached. This dye bath is heated with agitation in a closed container to 130° C. and held at this temperature for 30 minutes, and then cooled to 25° C. The polyester fiber is removed from the dye bath, rinsed with water and dried at 80° C. The polyester fiber is dyed in a level, speck-free pink shade. The dyeing possesses outstanding fastness to sublimation and outstanding lightfastness.

Example 5

1.5 g of the dispersion of Modification "B", prepared as described in Example 3, is blended with 14.0 g of modified guar gum, 3.0 g of Barisol BRM Super and 180 ml of water. 10 g of polyester fabric are measured into the above liquor at 49° C. The excess liquor then is squeezed out with a wringer. The wet fabric is dried at 121° C. for 60 seconds, thermosoled in hot air at 227° C. for 30 seconds, cooled to 25° C., rinsed with water and dried at 60° to 80° C. The fabric is dyed in a level, speck-free pink shade of outstanding light and sublimation fastness.

Example 6

0.1 to 0.5 g dry dyestuff solids of Modification "B", prepared as described in Example 1, are mixed with a suitable resin plastic, such as pelletized polystyrene for 10 minutes on a paint shaker and extruded in an injection molding machine at 415°–435° F. and 650–700 psi to yield red transparent chips which are optically clear.

Example 7

100 g of a water wet filtercake, containing 80% solids of Modification "A", is dried in an air oven at 185° C. for 24 hours. The resulting 80 g dried material is cooled and ground to a fine powder and consists entirely of Modification "B".

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A modification of the anthraquinone dyestuff of the formula

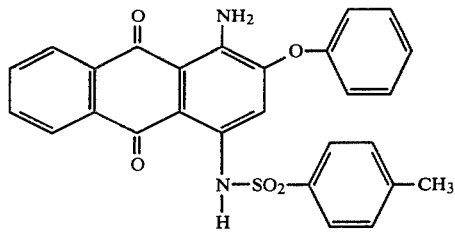

characterized by a melting point of 199°–200° C., with lattice plane spacings of strong intensity at 6.5 A°, 18.1 A° and 20.6 A°; of moderate intensity at 10.2 A°, 10.4 A°, 15.9 A°, 16.4 A°; of faint intensity at 21.0 A°, 28.5 A° and 28.9 A°.

2. A process for preparing the anthraquinone dyestuff modification of claim 1, characterized by heating an aqueous slurry of the modification of the anthraquinone dyestuff of the formula

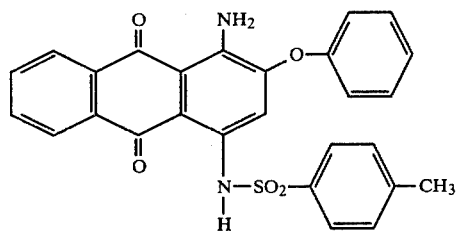

with lattice plane spacings of strong intensity at 7.2 A°, 19.0 A° and 19.4 A°; medium intensity at 11.2 A°, 13.2 A°, 17.0 A° and 27.8 A°; faint intensity at 9.7 A°, 12.9 A° and 29.8 A° to 90°–185° C.

3. A process according to claim 2, wherein said process temperatures are 125°–150° C.

4. Dyeing and printing preparations containing the anthraquinone dyestuff modification of claim 1.

5. Synthetic resins colored with the anthraquinone dyestuff modification of claim 1.

6. In a process for the disperse dyeing of polyester fabrics with the anthraquinone dyestuff of the formula

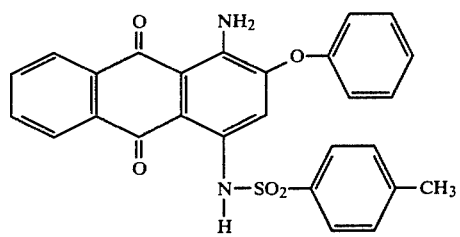

the improvement comprising:
(a) heat treating the crystal modification of said dyestuff having lattice spacings of strong intensity at 7.2 A°, 19.0 A° and 19.4 A° at temperatures of between 90° and 185° C. until substantially all of the dyestuff has strong intensity lattice spacings at 6.5 A°, 18.1 A° and 20.6 A° by Debye-Scherrer X-ray analysis; and (b) stably dispersing said dyestuff in an aqueous media.

7. The process of claim 6 wherein the dyeing is conducted at temperatures above 100° C. under super-atmospheric pressure.

8. The process of claim 6 wherein the dyeing is conducted in a boiling water under atmospheric pressure.

9. In a process for the thermosol dyeing of polyester fabrics with the anthraquinone dyestuff of the formula

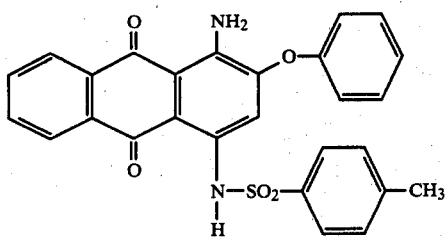

the improvement comprising utilizing the crystal form of said dyestuff having strong intensity lattice spacings of 6.5 A°, 18.1 A° and 20.6 A° by Debye-Scherrer X-ray analysis.

10. An aqueous dispersion of the anthraquinone dyestuff of the formula

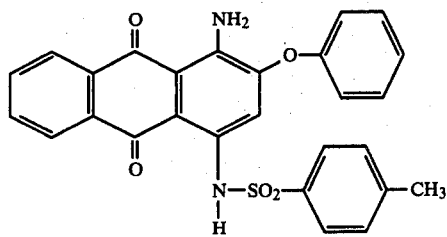

having strong intensity lattice spacings of 6.5 A°, 18.1 A° and 20.6 A° by Debye-Scherrer X-ray analysis which is suitable for the disperse dyeing of polyester fabric either at the boil or at temperatures above 100° C. under super-atmospheric pressure.

11. A process for rendering the anthraquinone dyestuff of the formula

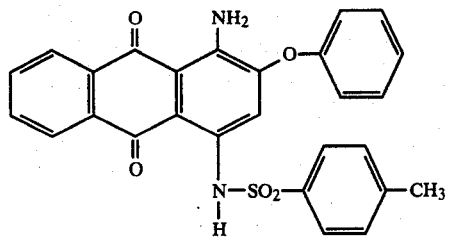

having strong intensity lattice spacings of 7.2 A°, 19.0 A° and 19.4 A° by Debye-Scherrer X-ray analysis suitable for the disperse dyeing of polyester fabrics comprising heating it until the crystal form has been substantially completely modified to display strong intensity lattice spacings at 6.5 A°, 18.1 A° and 20.6 A°.

12. The process of claim 11 wherein the dyestuff is heated in bulk.

13. The process of claim 11 wherein the dyestuff is heated in an aqueous medium.

14. A powder of the anthraquinone dyestuff having the formula

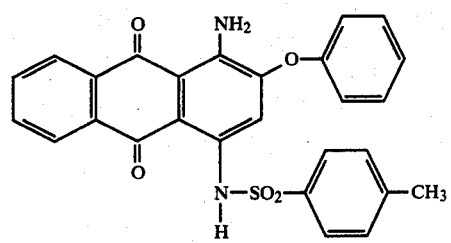

and displaying strong intensity lattice spacings of 6.5 A°, 18.1 A° and 20.6 A° by Debye-Scherrer X-ray analysis, said powder having a maximum particle size less than about one micron.

15. The anthraquinone dyestuff of the formula

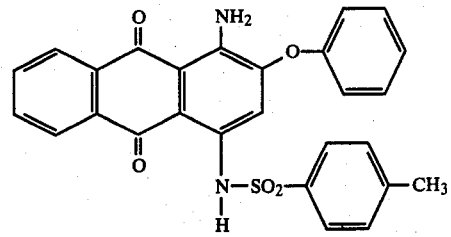

which displays strong intensity lattice spacings by Debye-Scherrer X-ray analysis of 6.5 A°, 18.1 A° and 20.6 A° in sufficiently finely divided form to form a stable aqueous dispersion with the aid of dispersants suitable for the disperse exhaust dyeing of synthetic fibers.

* * * * *